United States Patent
Hessels et al.

(10) Patent No.: US 8,544,914 B2
(45) Date of Patent: Oct. 1, 2013

(54) PIPE GRIPPING ASSEMBLY

(75) Inventors: Hendrik Hessels, Franeker (NL); Joop Roodenburg, Delft (NL)

(73) Assignee: ITREC B.V., Schiedam (NL)

( * ) Notice: Subject to any disclaimer, the term of this patent is extended or adjusted under 35 U.S.C. 154(b) by 181 days.

(21) Appl. No.: 12/990,118

(22) PCT Filed: Apr. 29, 2008

(86) PCT No.: PCT/NL2008/000119
§ 371 (c)(1),
(2), (4) Date: Mar. 9, 2011

(87) PCT Pub. No.: WO2009/134117
PCT Pub. Date: Nov. 5, 2009

(65) Prior Publication Data
US 2011/0148133 A1    Jun. 23, 2011

(51) Int. Cl.
*B66C 1/00* (2006.01)
*B66C 1/42* (2006.01)

(52) U.S. Cl.
USPC .......................................... 294/106; 294/198

(58) Field of Classification Search
USPC ................. 294/106, 192, 198, 104, 115, 902;
166/77.51, 85.5, 85.1; 81/57.15, 57.16, 57.2,
81/57.24, 57.33–57.34; 269/249, 143
See application file for complete search history.

(56) References Cited

U.S. PATENT DOCUMENTS

| | | | | |
|---|---|---|---|---|
| 3,202,449 A | * | 8/1965 | Lemelson | 294/198 |
| 3,902,614 A | * | 9/1975 | Roberts et al. | 414/735 |
| 4,810,019 A | * | 3/1989 | Brucher | 294/106 |
| 5,201,501 A | * | 4/1993 | Fassler | 269/32 |
| 5,669,653 A | | 9/1997 | Penisson | |
| 5,702,139 A | | 12/1997 | Buck | |
| 7,191,686 B1 | * | 3/2007 | Angelle et al. | 81/57.34 |

FOREIGN PATENT DOCUMENTS

CA    2 270 741 A1    1/2000

* cited by examiner

*Primary Examiner* — Stephen Vu
(74) *Attorney, Agent, or Firm* — Birch, Stewart, Kolasch & Birch, LLP

(57) ABSTRACT

A pipe gripping assembly for handling a pipe includes at least two gripping members, wherein each gripping member comprises a pipe engaging portion engageable with the outer circumference of a pipe, wherein at least one gripping member is rotatable about a pivot axis, and wherein the pipe gripping assembly further comprises actuation means to rotate the at least one rotatable gripping member such that the pipe gripping assembly is movable between an open position for receiving a pipe and a closed position in which the pipe engaging portions engage with a pipe, wherein each rotatable gripping member further comprises a locking body engaging portion and the pipe gripping assembly further comprises a movable locking body and associated displacement means to move the locking body such that the pipe gripping assembly is lockable in the closed position by moving the locking body to a locking position.

12 Claims, 5 Drawing Sheets

PIPE GRIPPING ASSEMBLY

CROSS-REFERENCE TO RELATED APPLICATIONS

This application is a National of PCT/NL2008/000119 filed on Apr. 29, 2008.

BACKGROUND OF THE INVENTION

1. Field of Invention

The present invention relates to a pipe gripping assembly.

2. Background of the Invention

An example of such a pipe gripping assembly can be found in GB 1 456 703. In this known assembly, the actuation means to open and close the pivotable gripping members comprise a hydraulic cylinder. The gripping action, wherein the pipe is engaged by and clamped between the gripping members, is produced by this hydraulic cylinder. During the gripping action, failure of the hydraulic cylinder will probably cause the pivotable gripping members to open, with unwanted disengagement of the pipe as a result.

SUMMARY OF THE INVENTION

It is an object of the invention to provide a pipe gripping assembly that prevents unwanted disengagement of the pipe in case of failure of actuation means.

The invention provides a pipe gripping assembly, wherein each pivotable gripping member further comprises a locking body engaging portion and wherein the pipe gripping assembly further comprises a movable locking body and associated displacement means to move the locking body such that the pivotable gripping members are lockable in the closed position by moving the locking body to a locking position wherein the locking body is engageable with the locking body engaging portion and prevents motion of the pivotable gripping members to the open position.

The advantage is that the pipe gripping assembly is now lockable even when the actuation means to move the pivotable gripping members to the closed position fail. Failure of these actuation means will not move the pivotable gripping members away from their closed position, because the locking body blocks the rotation of the pivotable gripping members such that movement from the closed position to an open position is prevented, thereby preventing disengagement of the pipe.

Preferably, the locking body is in engagement with the locking body engaging portion in the closed position of the gripping member.

In an embodiment of the invention, the geometry of the locking body is such that in the locking position forces exerted on the locking body by the locking body engaging portions are mainly perpendicular with respect to the displacement direction of the locking body. This makes the pipe gripping assembly lockable even when the aforementioned actuation means and the displacement means fail. If a pivotable gripping member moves in the direction of the open position, the locking body engaging portion engages with the locking body. And when the locking body engaging portion engages with the locking body a force acts on the locking body due to this engagement. This force can not move the locking body away from its locking position in the displacement direction of the locking body, because the direction of the force is mainly perpendicular to the displacement direction of the locking body. No force in the displacement direction of the locking body exerted by the displacement means is necessary to keep the locking body in place. A possible reason why a pivotable gripping member moves in the direction of the open position is when the actuation means fail.

In an embodiment, two generally opposed pivotable gripping members with locking body engaging portions are provided, and the geometry of the locking body is such that in the locking position the lines of action of forces exerted on the locking body by the locking body engaging portions mainly coincide and these forces are mainly opposite to each other. Opposite forces cancel each other at least partially and this has the advantage that at least the net force on the locking body is decreased. Also a variant with more than two gripping members is conceivable. This embodiment thus tries to take at least partially away a cause that possibly results in movement of the locking body.

An additional advantage is that the moment arm between the forces is very small thereby decreasing the net moment on the locking body. Also a variant with more than two gripping members is conceivable.

Preferably, forces exerted on the locking body by the locking body engaging portions are equal in magnitude, opposite to each other, and have coinciding lines of actions resulting in no net force and no net moment on the locking body, thereby eliminating two possible causes that result in movement of the locking body.

In an embodiment, two similar shaped and symmetrically placed gripping members with locking body engaging portions are provided, between which a symmetrically shaped locking body is arranged to lock the pipe gripping assembly. This will result in symmetrical forces on the locking body.

In an embodiment the locking body displacement means are distinct from the actuation means. In a preferred variant, the actuation means are formed by the displacement means, such that movement of the locking body to a locking position causes the one or more gripping members to pivot to their closed position. This has the advantage that moving the locking body and pivoting the gripping members is done in one single action.

Preferably, the displacement means comprise a hydraulic or pneumatic cylinder.

In an embodiment, a translatable gripping member is provided with associated actuation means that has a pipe engaging portion which engages with the pipe at a position generally opposite to the pipe engaging portions of the other gripping members. The clamping action by the translatable gripping member is especially advantageous if the other gripping members are not able to clamp the pipe themselves. Clamping of the pipe is necessary to prevent disengagement of the pipe during normal handling operations, wherein the pipe gripping assembly may have different orientations, for example an orientation wherein the longitudinal axis of the pipe is oriented vertically. In such an extreme orientation, the clamping action can still be able to prevent disengagement of the pipe.

Preferably, the locking body withstands the forces originating from the clamping action by the translatable gripping member and associated actuation means, thereby ensuring that the clamping action remains when the actuation means of the other gripping members fail.

Preferably the associated actuation means of the translatable gripping member comprise a hydraulic or pneumatic cylinder.

In an embodiment, the locking body engaging portion is formed by roller bearings. This has the advantage that friction during engagement of the locking body with the locking body engaging portions is diminished and thereby wear of the locking body engaging portion and the locking body is diminished.

In an embodiment, the pipe engaging portion comprises a jaw insert with a rough or toothed surface. This results in more friction between the pipe engaging portion and the pipe and makes the pipe easier to handle.

Preferably, the gripping members are mainly curved, and have a concave side that faces the pipe. The advantage of the curved gripping members and the concave side facing the pipe is that the surface area of the pipe engaging portions that engage with the pipe increases, thereby making the pipe easier to handle. An additional advantage is that it makes clamping of pipes with a diameter close to the radius of curvature of the gripping members possible without the use of the translatable gripping member and associated actuation means. When the clamping action by the gripping members is not sufficient to prevent disengagement of the pipe, it is conceivable that the curved gripping members are used in combination with the translatable gripping member and associated actuation means.

Preferably, the actuation means to move the pivotable gripping members to the open position comprise a spring. Alternatively, this is performed by the same cylinder for closing.

Preferably, the pipe gripping assembly is able to handle pipes with different outer diameters. In case of two rotatable gripping members, this can be achieved by a locking body having a tapered shape at least at the part that is engageable with the locking body engaging portions.

Preferably, the pipe gripping assembly is able to handle multiple pipes at the same time.

The invention further provides a pipe handling crane, a pipe racker or a drilling rig comprising at least one pipe handling assembly as described above.

BRIEF DESCRIPTION OF THE DRAWINGS

Embodiments of the invention will be described in a non-limiting way with reference to the drawing.

In the drawing.

DETAILED DESCRIPTION OF THE PREFERRED EMBODIMENTS

Figure 1:
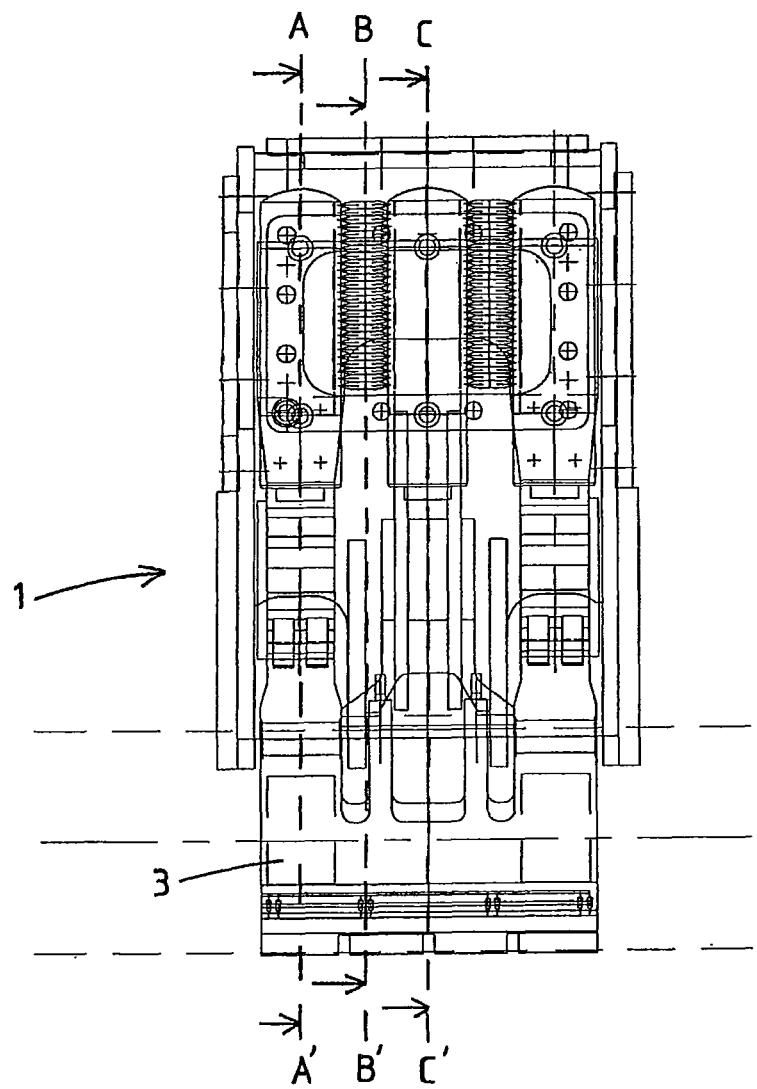
FIG. 1 shows a front view of an embodiment according to the invention

FIG. 1 shows a front view of a pipe gripping assembly 1 for handling a pipe according to the invention. In the lower part of the pipe gripping assembly 1, a gripping member 3 is shown to handle a pipe. Above the gripping member 3 different sections are provided in this embodiment, each section having a particular function. The features of the se sections will be shown in the FIGS. 2-4 through different cross section views along respectively lines A-A', B-B', and C-C'. In this embodiment, the pipe gripping assembly is symmetrical with respect to the cross section along line C-C'. In this embodiment, the sections corresponding to lines A-A' and B-B' are thus provided twice. This is in particular advantageous for pipe gripping assemblies handling pipes with a mass of more than 1 ton, preferably in the range 4-20 ton, wherein large mechanical loads occur and the symmetry and double construction ensure that peak loads in the pipe handling assembly are avoided as much as possible.

Figure 2:
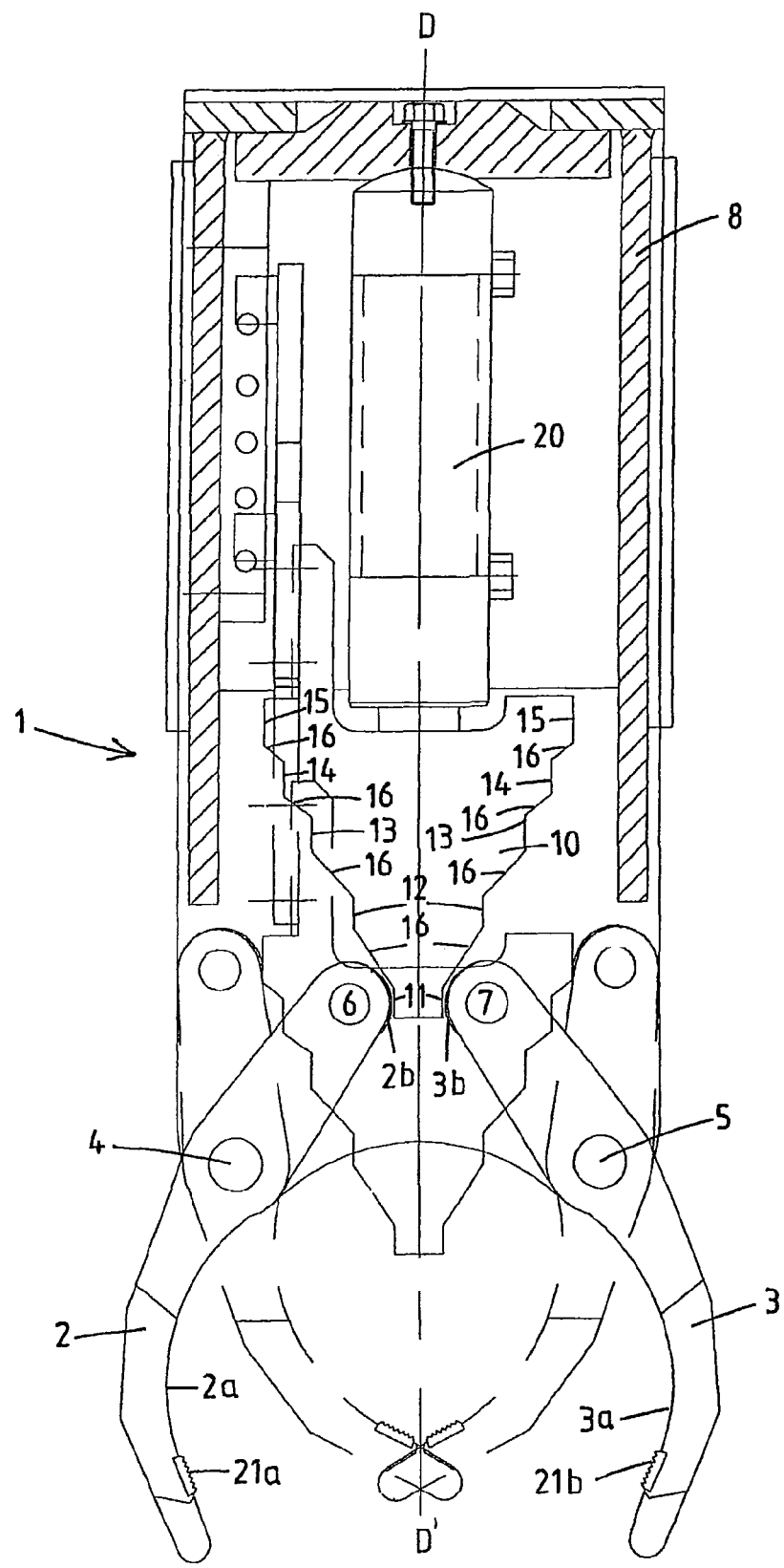
FIG. 2 shows a cross sectional view of the embodiment of FIG. 1 along line A-A', with the gripping members and locking body in two positions.

In FIG. 2 is shown a cross sectional view of a pipe gripping assembly 1 of FIG. 1 along line A-A'. The pipe gripping assembly comprises two gripping members 2 and 3, wherein each gripping member comprises a pipe engaging portion, respectively denoted 2a and 3a, each pipe engaging portion 2a and 3a being engageable with the outer circumference of a pipe (not shown). The gripping members 2 and 3 in this embodiment are both pivotable about respectively pivot axis 4 and 5 with respect to frame 8.

The gripping members 2 and 3 each comprise a locking body engaging portion, respectively denoted 2b and 3b at its respective ends 6, 7. This locking body engaging portion 2b and 3b is engageable with a movable locking body 10. In this embodiment, a hydraulic cylinder 20 is provided to move the locking body 10. The hydraulic cylinder is on one end fixed to frame 8 and on the other end to locking body 10.

FIG. 2 shows the gripping members 2 and 3 and the locking body 10 in two different positions. When the locking body 10 is in its uppermost position, the gripping members 2 and 3 are in an open position for receiving a pipe. When the hydraulic cylinder 20 moves locking body 10 to its lowermost position, the gripping members 2 and 3 are moved to a closed position.

In this embodiment, the locking body 10 comprises multiple parallel surface pairs 11, 12, 13, 14, 15, each surface pair 11, 12, 13, 14, 15 corresponds to an open or a closed position of the gripping members. Whether the position is an open or closed position depends on the diameter of the pipe to be handled as will be explained later in FIG. 5a-5e. The slanted surfaces 16 are transition surfaces to guide locking body engaging portions 2b and 3b between the surface pairs 11, 12, 13, 14 and 15 when the locking body 10 is translated by the hydraulic cylinder 20.

The two surfaces of each surface pair 11, 12, 13, 14, 15 are oriented parallel to each other. This has the advantage that the forces exerted at the location of a surface pair 11, 12, 13, 14, 15 on the locking body 10 by the locking body engaging portions 2b and 3b are mainly perpendicular to each other.

In this embodiment, the pipe gripping assembly 1 is substantially symmetrical about a plane through line D-D' and parallel to pivot axis 4 and 5. In this way, the forces are not only perpendicular, they are also opposite to each other and perpendicular to the displacement direction of the locking body 10. Furthermore, the lines of action of the forces mainly coincide. The advantage is that the net force on the locking body 10 is minimal. The fact that the forces are perpendicular to the displacement direction of the locking body has the advantage that if hydraulic cylinder 20 fails, the locking body 10 will not move due to forces exerted at the location of a surface pair 11, 12, 13, 14, 15 on the locking body 10 by locking body engaging portions 2b and 3b.

Pipe engaging portions 2a and 3a here comprise a jaw insert 21 a and 21 b with a toothed surface for extra grip on a pipe. The locking body engaging portions 2b and 3b are provided with bearing surfaces, such that the locking body engaging portions 2b and 3b in this embodiment can roll along surfaces 11 and 12.

In this embodiment, movement of the locking body downwards results in that the two pipe engaging portions 2a and 3a are moved to each other. If the locking body 10 does not move, the locking body 10 prevents the gripping members 2 and 3 to move such that the distance between the pipe engaging portions 2a and 3a increases. Each open and closed position corresponding to surface pairs 11, 12, 13, 14, 15 is thus also a locking position.

It is also envisaged that the pipe gripping assembly comprises a sensor system to measure the position of the locking body 10. In combination with a control system, this allows the automation of the operation of the locking body 10.

Because in this embodiment locking body 10 can only push at locking body engaging portions 2b and 3b and not pull, an upward movement of the locking body 10 will not increase the distance between pipe engaging portions 2a and 3a. If no actuation means are provided that are able to increase the distance between pipe engaging portions 2a and 3a, it is possible that when the locking body 10 moves upwards, the locking body engaging portions 2b and 3b disengage from the locking body 10 and the gripping members 2 and 3 stay in the same position. Therefore, a spring mechanism is provided as shown in FIG. 3.

Figure 3:
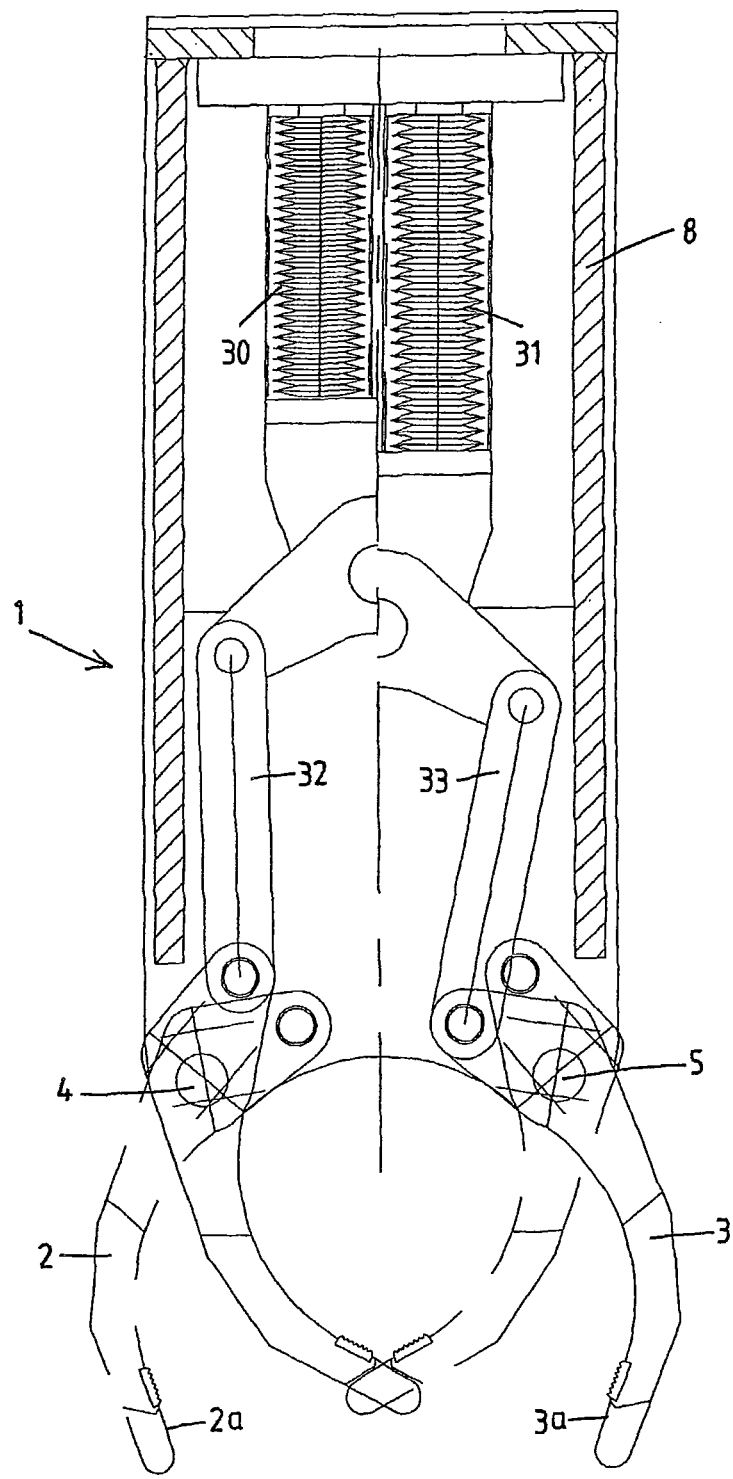
FIG. 3 shows a cross sectional view of the embodiment of FIG. 1 along line B-B', with the gripping members in two positions.

FIG. 3 shows a cross sectional view of the embodiment of FIG. 1 along line B-B', and shows gripping members 2 and 3 in the same positions of FIG. 2. The pipe gripping assembly further comprises springs 30, 31 and linkage mechanisms here with rods 32, 33 connecting the springs 30 and 31 to the gripping members 2 and 3. On the left the spring 30 and corresponding rod 32 are shown for the position wherein the locking body 10 of FIG. 2 is in its lowermost position and on the right, the spring 31 and corresponding rod 33 are shown in case of the position wherein the locking body 10 of FIG. 2 is in its uppermost position.

On one end, the springs 30, 31 are connected to frame 8, and on the other end, they are connected to the linkage mechanism. In order to ensure that the distance between pipe engaging portions 2a and 3a is increased when desired, the springs 30 and 31 have to be in a compressed state in all positions of the gripping members, such that the springs 30 and 31 exert a downward force on the rods 32 and 33 and tend to increase the distance between pipe engaging portions 2a and 3a. This downward force pushes the locking body engaging portions 2b and 3b shown in FIG. 2 against locking body 10. When locking body 10 is moved downwards by the hydraulic cylinder 20, the pipe engaging portions 2a and 3a move to each other. When locking body 10 is moved upwards by hydraulic cylinder 20, the pipe engaging portions 2a and 3a are moved away from each other due to springs 30 and 31 which are connected to gripping members 2 and 3 through rods 32 and 33. It is also conceivable that when the locking body 10 is in its uppermost position, the springs 30 and 31 are in a rest position and do not exert a force on the rods 32 and 33. The compression of the springs 30 and 31 then starts when the locking body 10 is moved downwards from its uppermost position.

Figure 4:
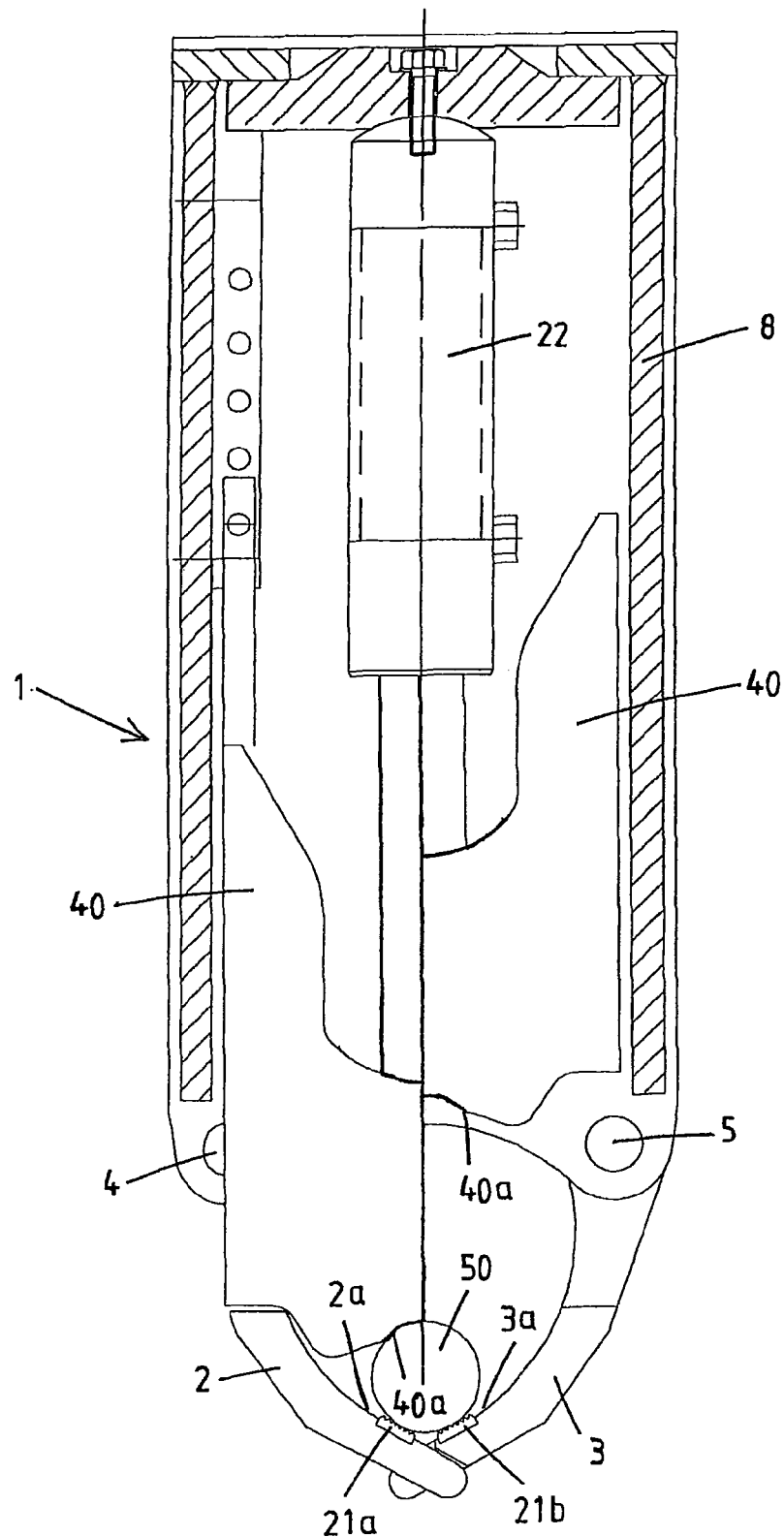
FIG. 4 shows a cross sectional view of the embodiment of FIG. 1 along line C-C', with the translatable gripping member in two positions.

In FIG. 4 is shown a cross sectional view of the pipe gripping assembly 1 of FIG. 1 along line C-C'. This figure shows the gripping members 2 and 3 in a closed position. The pipe engaging portions 2a and 3a comprise jaw inserts 21a and 21b, which jaw inserts 21a, 21b engage with a pipe 50. Pipe 50 has a small diameter such that the engagement of jaw inserts 21a and 21b with pipe 50 does not result in a clamping action of the pipe 50. There is the possibility that pipe 50 disengages.

The pipe gripping assembly 1 in this embodiment is therefore also provided with a translatable gripping member 40 and associated actuation means, in this case a hydraulic cylinder 21. The hydraulic cylinder 22 is able to move the translatable gripping member 40 up and down. The hydraulic cylinder 22 is attached to frame 8 at one end, the other end is attached to translatable gripping member 40.

On the left, translatable gripping member 40 is shown in a lowermost position, and on the right, translatable gripping member 40 is shown in an uppermost position. In the lowermost position, the translatable gripping member 40 comprises a pipe engaging portion 40a which engages with the pipe 50 at a location that is mainly opposite to the location where the pipe engaging portions 2a and 3a engage with the pipe 50. The pipe 50 is now clamped between the translatable gripping member 40 and the pipe engaging portions 2a and 3a. The clamping action on pipe 50 is determined by the force that the translatable gripping member 40 exerts on the pipe 50. If gripping members 2 and 3 were not locked by the locking body in FIG. 2, the force from the translatable gripping member 40 on pipe 50 would move the pipe engaging portions 2a and 3a away from each other to an open position and the pipe 50 would disengage.

It is conceivable that the pipe gripping assembly 1 further comprises a sensor system to measure the position of the translatable gripping member. This can be used in some kind of control system to automate the operation of the translatable gripping member.

Figures 5A, 5B, 5C, 5D, 5E:
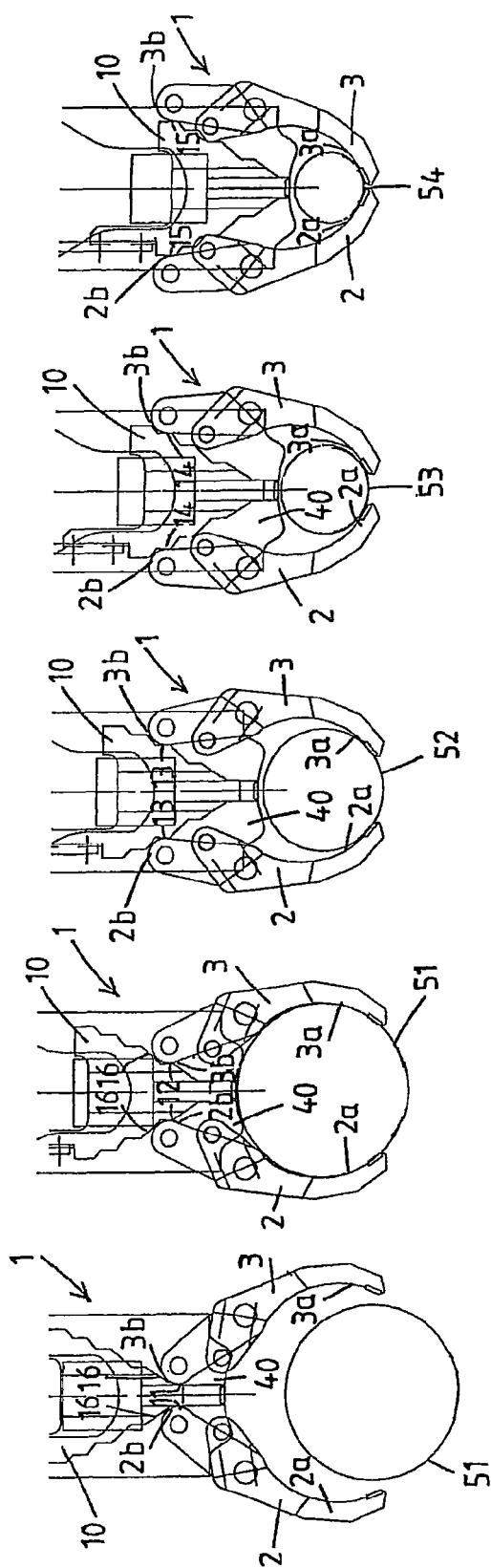
FIG. 5a-5e shows a side view of the embodiment of FIG. 1 in different positions.

FIG. 5a-5e shows the gripping members 2 and 3 in different open and closed positions. FIG. 5a shows the locking body 10 in the uppermost position, referred to as a first position, wherein the locking body engaging portions 2b and 3b engage with the surface pair 11. The pipe engaging portions 2a and 3a are now as far apart as possible for this embodiment. A pipe 51 can now be received by the gripping members 2 and 3. This position is therefore an open position for pipe 51, but also an open position for pipes with a smaller diameter. In this embodiment, a diameter equal to the pipe 51 is the largest pipe diameter this pipe handling assembly 1 can handle.

In FIG. 5b, the locking body 10 is moved to a second position, wherein the locking body engaging portions 2b and 3b engage with the surface pair 12, and wherein pipe engaging portions 2a and 3a engage with the pipe 51. This second position is now a closed position for pipe 51, but can be an open position for pipes with smaller diameters, as long as a pipe can be received by gripping members 2 and 3.

FIG. 5c shows the gripping members 2 and 3 in a third position, wherein the locking body 10 has been moved down by hydraulic cylinder 20, such that the surface pair 13 engages with locking body engaging portions 2b and 3b. This third position is a closed position for a pipe 52 which has a smaller diameter than pipe 51. However, it can be an open position for pipes with a smaller diameter.

In FIG. 5d, the locking body has been moved downwards to a fourth position, such that the locking body engaging portions 2b and 3b engage with the surface pair 14 and pipe engaging portions 2a and 3a are moved closer to each other compared to FIG. 5a-5c. The pipe gripping assembly 1 is now able to handle pipe 53, which has a smaller diameter than pipe 52. For pipe 52, the fourth position is a closed position, but for smaller diameter pipes, the fourth position can be an open position.

FIG. 5e shows the locking body 10 in the lowermost position of FIG. 2, referred to as a fifth position, such that the locking body engaging portions 2b and 3b engage with the surface pair 15. This fifth position is a closed position for almost all pipe diameters, since The distance between pipe engaging portions 2a and 3a is very small.

The many open and closed positions show that the pipe handling assembly in this embodiment is capable of handling pipes with different diameters. FIGS. 5a and 5b show that for pipe 51 the translatable gripping member 40 is not necessary to clamp pipe 51. Moving the locking body 10 down, will result in a clamping action when the locking body engaging portions 2b and 3b engage with surfaces 16. However, when hydraulic cylinder 20 fails, the clamping action will decrease. For smaller pipe diameters than pipe 51, the gripping members 2 and 3 are not able to clamp the pipe, and translatable gripping member 40 always has to engage with a pipe to clamp the pipe, especially when the pipe has to be oriented vertically.

Referring to FIG. 1 again, the sections of FIGS. 2, 3 and 4 can be combined in a pipe gripping assembly 1, wherein the pivotable gripping members 2 and 3 (only gripping member 3 is shown in this side view) here are elongated in the direction of the pipe. Two sections according to FIG. 2 are provided at the end of the gripping member 3. One section according to FIG. 4 is provided in the middle of the gripping member 3 and two sections according to FIG. 3 are provided, one between each section according to FIG. 2 and the section according to FIG. 4. The pipe gripping assembly 1 is therefore mainly symmetrical with respect to a plane defined by line C-C' and perpendicular to the gripping member 3.

The invention claimed is:

1. A pipe gripping assembly for handling a pipe comprising:
   at least two gripping members, wherein each of the gripping members comprises a pipe engaging portion engageable with an outer circumference of a pipe, and wherein at least one of the gripping members is pivotable about a pivot axis,
   an actuation mechanism to pivot the at least one pivotable gripping member such that said at least one pivotable gripping member is movable between an open position for receiving a pipe and a closed position in which the pipe engaging portion engages with a pipe,
   wherein each of the pivotable gripping members further comprises a locking body engaging portion and the pipe gripping assembly further comprises a movable locking body and an associated displacement mechanism to move the locking body such that the pivotable gripping members are lockable in the closed position by moving the locking body to a locking position, wherein the locking body is engageable with the locking body engaging portion, and prevents motion of the pivotable gripping members to the open position, and
   wherein the locking body comprises multiple parallel surface pairs to engage with the respective locking body engaging portions of the gripping members, wherein each of the surface pairs corresponding to a different position of the gripping members.

2. The pipe gripping assembly according to claim 1, wherein the shape of the locking body is such that in the locking position forces exerted on the locking body by the locking body engaging portions are mainly perpendicular with respect to a displacement direction of the locking body.

3. The pipe gripping assembly according to claim 2, wherein two of the pivotable gripping members being generally opposed with the locking body engaging portions are provided, and wherein the shape of the locking body is such that forces exerted on the locking body by the locking body engaging portions are mainly opposite to each other.

4. The pipe gripping assembly according to claim 2, wherein two of the pivotable gripping members with locking body engaging portions are provided, between which a symmetrically shaped locking body can be moved to lock the pipe gripping assembly.

5. The pipe gripping assembly according to claim 2, wherein a translatable gripping member is provided with the associated actuation mechanism that has a pipe engaging portion which engages with the pipe at a position generally opposite to the pipe engaging portions of the other gripping members.

6. The pipe gripping assembly according to claim 1, wherein two of the pivotable gripping members being generally opposed with the locking body engaging portions are provided, and wherein the shape of the locking body is such that forces exerted on the locking body by the locking body engaging portions are mainly opposite to each other.

7. The pipe gripping assembly according to claim 6, wherein two of the pivotable gripping members with locking body engaging portions are provided, between which a symmetrically shaped locking body can be moved to lock the pipe gripping assembly.

8. The pipe gripping assembly according to claim 6, wherein a translatable gripping member is provided with the associated actuation mechanism that has a pipe engaging portion which engages with the pipe at a position generally opposite to the pipe engaging portions of the other gripping members.

9. The pipe gripping assembly according to claim 1, wherein two of the pivotable gripping members with locking body engaging portions are provided, between which a symmetrically shaped locking body can be moved to lock the pipe gripping assembly.

10. The pipe gripping assembly according to claim 9, wherein a translatable gripping member is provided with the associated actuation mechanism that has a pipe engaging portion which engages with the pipe at a position generally opposite to the pipe engaging portions of the other gripping members.

11. The pipe gripping assembly according to claim 1, wherein a translatable gripping member is provided with the associated actuation mechanism that has a pipe engaging portion which engages with the pipe at a position generally opposite to the pipe engaging portions of the other gripping members.

12. The pipe gripping assembly according to claim 1, wherein the pipe engaging portion comprises a jaw insert with a rough or toothed surface.

* * * * *